United States Patent
Baird et al.

(10) Patent No.: US 9,499,257 B2
(45) Date of Patent: Nov. 22, 2016

(54) WEIGHT REDUCING LANDING GEAR FEATURES

(71) Applicant: GOODRICH CORPORATION, Charlotte, NC (US)

(72) Inventors: Bradley William Baird, Grimsby (CA); Travis Lamoreaux, Burlington (CA)

(73) Assignee: Goodrich Corporation, Charlotte, NC (US)

( * ) Notice: Subject to any disclaimer, the term of this patent is extended or adjusted under 35 U.S.C. 154(b) by 542 days.

(21) Appl. No.: 13/919,781

(22) Filed: Jun. 17, 2013

(65) Prior Publication Data

US 2014/0367513 A1  Dec. 18, 2014

(51) Int. Cl.
*B64C 25/02* (2006.01)
*B64C 25/00* (2006.01)

(52) U.S. Cl.
CPC ............. *B64C 25/02* (2013.01); *B64C 25/00* (2013.01); *B64C 25/001* (2013.01)

(58) Field of Classification Search
CPC .................. B64C 25/001; B64C 25/02; B64C 25/00
See application file for complete search history.

(56) References Cited

U.S. PATENT DOCUMENTS 2,440,068 A   4/1948  Beringer
6,318,669 B1 * 11/2001  Dazet ...................... B64C 25/00
                                                              244/100 R

FOREIGN PATENT DOCUMENTS

| EP | 1060986 | 12/2000 |
|----|---------|---------|
| EP | 2143634 | 1/2010 |
| GB | 825997  | 12/1959 |
| GB | 2452938 | 3/2009 |

OTHER PUBLICATIONS

Extended European Search Report dated Oct. 21, 2014 in European Application No. 14165251.1.
Shubhrata Nagpall, et al., "Stress Concentration and its Mitigation Techniques in Flat Plate with Singularities: A Critical Review," Engineering Journal, vol. 16, No. 1, Jan. 16, 2012, retrieved from http://engj.org/index.php/ej/article/view/152/126.

* cited by examiner

*Primary Examiner* — Nicholas McFall
(74) *Attorney, Agent, or Firm* — Snell & Wilmer L.L.P.

(57) ABSTRACT

Aircraft landing gear is provided comprising a trunnion arm having a centering portion and a first stress relieving portion and an outer cylinder coupled to the trunnion arm is disclosed. The first stress relieving portion may relieve stress spreading from the centering portion to the outer cylinder. In addition, the first stress relieving portion may be disposed adjacent the centering portion, and may relieve stress spreading from the centering portion to at least one trunnion arm portion. In various embodiments, the aircraft landing gear disclosed herein may further comprise a cross bolt portion formed in a portion of the trunnion arm and a second stress relieving portion disposed adjacent the cross bolt portion. The second stress relieving portion may relieve stress spreading from the cross bolt portion to at least one trunnion arm portion.

19 Claims, 4 Drawing Sheets

WEIGHT REDUCING LANDING GEAR FEATURES

FIELD

The present disclosure relates to aircraft landing gear, and more particularly, to features that reduce the weight of landing gear.

BACKGROUND

Landing gear allows an aircraft to move while it is not in the air (e.g., while it is taxiing or maneuvering on land), and so the landing gear is typically constructed to absorb and withstand the enormous weight of the aircraft on land as well as the forces and stresses generated by the aircraft during landing. These factors have led to hearty landing gear assemblies.

SUMMARY

In various embodiments, aircraft landing gear is provided comprising a trunnion arm having a centering portion and a first stress relieving portion and an outer cylinder coupled to the trunnion arm. The first stress relieving portion may relieve stress spreading from the centering portion to the outer cylinder. In addition, the first stress relieving portion may be disposed adjacent the centering portion, and may relieve stress spreading from the centering portion to at least one trunnion arm portion. In various embodiments, the aircraft landing gear disclosed herein may further comprise a cross bolt portion formed in a portion of the trunnion arm and a second stress relieving portion disposed adjacent the cross bolt portion. The second stress relieving portion may relieve stress spreading from the cross bolt portion to at least one trunnion arm portion.

Further, in various embodiments, the aircraft landing gear may comprise a cross bolt portion formed in a portion of the trunnion arm and second and third stress relieving portions disposed adjacent the cross bolt portion. The second and third stress relieving portions relieve stress spreading from the cross bolt portion to at least one trunnion arm portion. In addition, the trunnion arm (as shown, for example, at FIG. 4) may have a curved outer profile, an hourglass shaped outer profile, an elliptical shaped outer profile, and/or a cylindrical shaped inner profile.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
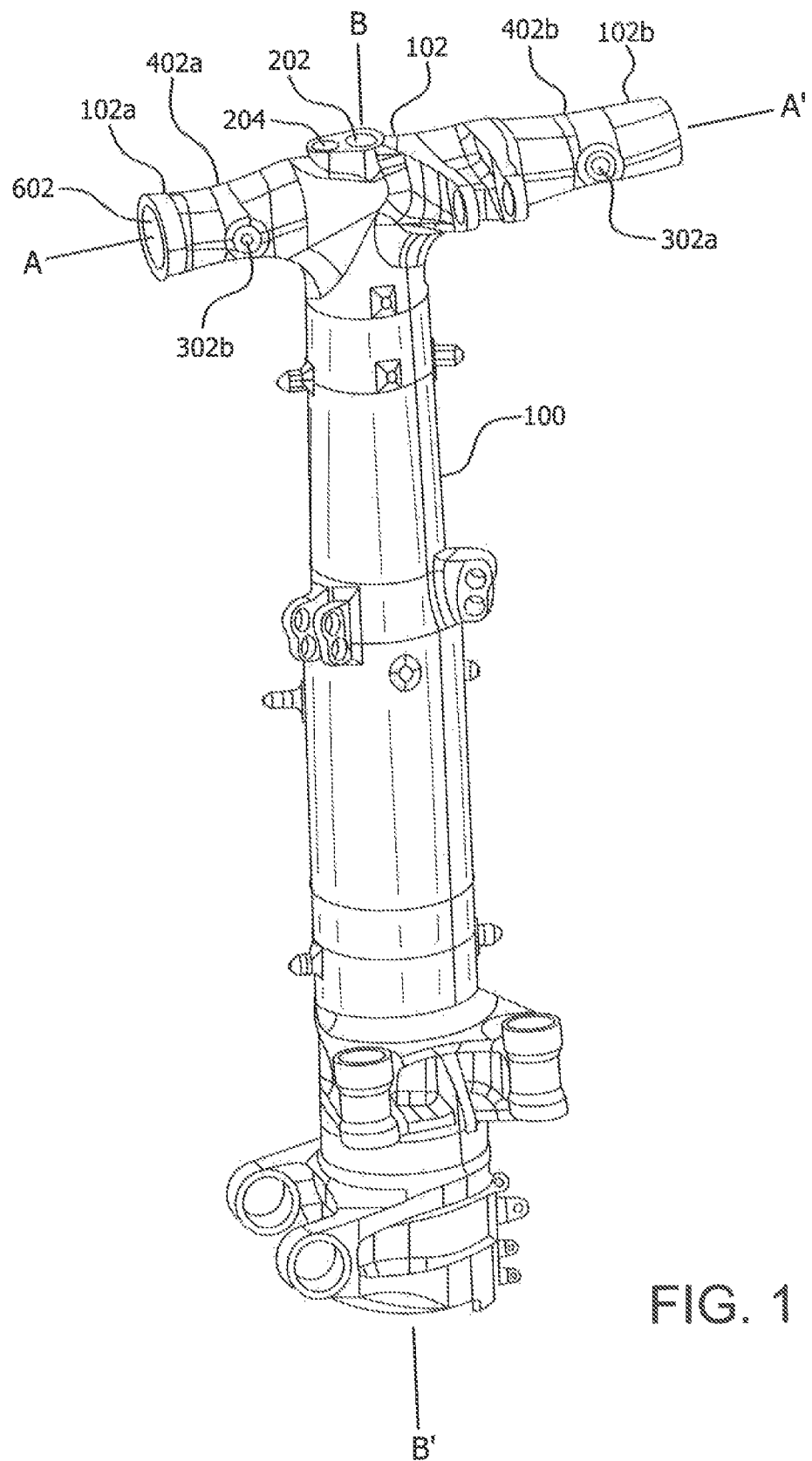
FIG. 1 illustrates, in accordance with various embodiments, a perspective view of an aircraft landing gear outer cylinder and trunnion arm.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As discussed above, aircraft rely upon landing gear to absorb the impact of landing as well as to travel over land. As used herein, landing gear may comprise the structure disposed between the body of the aircraft (the "airframe"), and/or an actuating mechanism mounted thereto, and a landing element (e.g., a wheel, a skid, a pontoon, and the like) of the aircraft. To this end, landing gear may comprise an outer cylinder which may, together with a trunnion arm, couple the landing element of the aircraft to the airframe and/or the actuating mechanism. The outer cylinder may, in various embodiments, comprise a shock absorber or shock strut. An actuating mechanism, may, in addition, comprise any system or mechanism capable of and/or configured to raise and/or lower the landing gear. Thus, for example, the actuating mechanism may raise the landing gear after takeoff and/or lower the landing gear in preparation for landing.

The landing gear, including the outer cylinder and trunnion arm, may be configured to withstand tremendous forces and stress as the aircraft performs a landing maneuver. In addition, the landing gear supports the weight of the aircraft as it travels over land.

In various embodiments, the outer cylinder and trunnion arm may withstand the forces and stress described above, but may yet be constructed to have less mass than more conventional landing gear systems. In addition, in various embodiments, the stress borne by the outer cylinder and trunnion arm may be reduced over that borne by more conventional systems to improve the useful lifetime of the landing gear.

For example, in various embodiments, a central portion of a trunnion arm may include a stress relieving portion. This stress relieving portion may comprise a perimeter that defines a space, a cavity, an aperture, and/or a hole. In various embodiments, the stress relieving portion may comprise an annular shape and/or an annulus. The stress relieving portion may be disposed substantially adjacent to a centering portion. The centering portion may likewise comprise a perimeter defining a space, a cavity, an aperture, and/or a hole. The centering portion may also comprise an annulus and/or an annular shape.

With respect to the operation of the stress relieving portion, as the aircraft places stress on the landing gear, stress may spread from the centering portion out along the outer cylinder and/or trunnion arm. This stress may be focused in the vicinity of the centering portion and/or along the length (or a portion of the length) of the outer cylinder/trunnion arm.

The stress relieving portion may deflect or redirect the stress spreading from the centering portion, thereby increasing the durability of the entire outer cylinder and/or trunnion arm. In addition, inclusion of the stress relieving portion reduces the weight of the trunnion arm (and thus the aircraft itself). Further, where the stress relieving portion comprises an annulus, stress may be compensated for by the hoop strength contributed to the design of the landing gear by the stress relieving portion.

As a second example, a trunnion arm, as described above, may include one or more cross bolt portions. These cross bolt portions may comprise a perimeter that defines one or more spaces, a cavities, apertures, and/or holes. In various embodiments, the cross bolt portions may comprise an annular shape and/or an annulus, and stress may spread out from these cross bolt portions. Stress may be reduced along the trunnion arm and/or outer cylinder, and the lifetime of these components improved, by the inclusion of one or more stress relieving portions substantially adjacent to each cross bolt portion.

In addition, as a third example, a trunnion arm, or portions of a trunnion arm, may comprise a curved shape. For example, a trunnion arm, or a portion thereof, may resemble an hourglass. Thus, the outer and/or inner diameter of the trunnion arm may vary along the axis of the trunnion arm such that one or both of these diameters are greater at each trunnion arm endpoint than at a central portion of the trunnion arm. Such a construction may reduce stress experienced by the trunnion arm (as opposed, for example, to a trunnion arm having a cylindrical shape). This construction may, in addition, require less mass of material for the manufacture of the trunnion arm (as, for example, in comparison to a trunnion arm having a cylindrical shape). Thus, a curved trunnion arm may offer weight savings over trunnion arms of other shapes and designs.

Therefore, in various embodiments, and with reference to FIG. 1, an aircraft landing gear outer cylinder 100 and trunnion arm 102 are shown. As discussed more generally above, the outer cylinder 100 may couple, directly and/or indirectly, to an aircraft wheel (or other landing system elements), while the trunnion arm 102 may couple to the airframe of the aircraft and/or an actuating mechanism or system which may function to raise and/or lower the landing gear. For purposes of discussion below, the trunnion arm 102 may comprise a first portion 102a and a second portion 102b. As shown with respect to each of the FIGS. 1-5, the outer cylinder 100 may extend along an axis or length defined by the axis marked in each of the figures as B-B'. Similarly, as shown in each FIG. 1-5, the trunnion arm may extend along an axis or length defined by the axis marked in each of the figures as A-A'. Thus, the first portion 102a may generally extend along the axis A-A' from the axis B-B' in the direction of A. Similarly, the second portion 102b may generally extend along the axis A-A' from the axis B-B' in the direction of A'.

Figure 2:
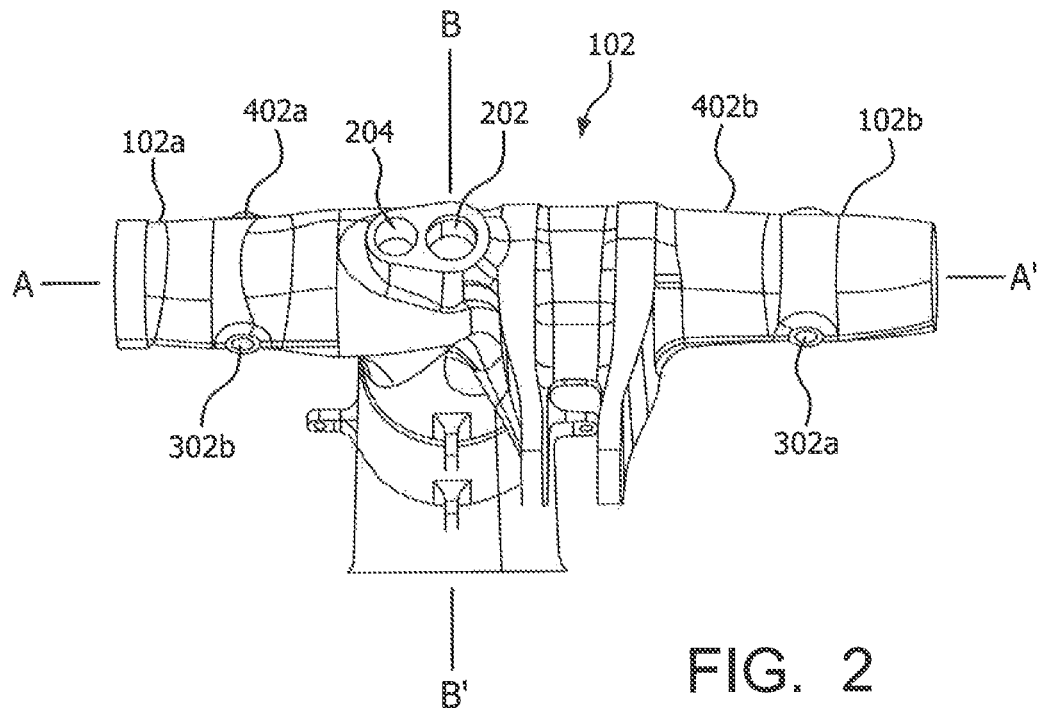
FIG. 2 illustrates, in accordance with various embodiments, a perspective view of a trunnion arm having a stress relieving portion.

As shown now in enlarged detail with respect to FIG. 2, a trunnion arm 102 may include a centering portion 202. The centering portion 202 may exist as a byproduct of the manufacturing process and may comprise a perimeter that defines a space, a cavity, an aperture, and/or a hole. In various embodiments, the centering portion 202 may comprise an annular shape and/or an annulus. However, as described above, as the aircraft to which the outer cylinder 100 is coupled places stress on the landing gear, stress may spread from the centering portion 202 to the outer cylinder 100 and/or to the trunnion arm 102. More particularly, stress may spread generally along the outer cylinder 100 along the axis marked B-B', while, along the trunnion arm 102, stress may generally spread along the axis marked A-A'.

To reduce stress spreading from the centering portion 202, a stress relieving portion 204 may be disposed in a position substantially adjacent to the centering portion 202. For example, the stress relieving portion 204 may be disposed substantially along the axis A-A'. In various embodiments, the stress relieving portion 204 may comprise a perimeter that defines a space, a cavity, an aperture, and/or a hole, in various embodiments, the stress relieving portion 204 may comprise an annular shape and/or an annulus. The stress relieving portion 204 may, in addition, help to distribute stress spreading from the centering portion 202 as well as reduce the weight of the trunnion arm 102.

With respect to the weight reductions made available by the stress relieving portion 204, the material absent from the trunnion arm 102 by the existence of the portion 204 itself may reduce the weight of the landing gear. Absent the portion 204, the outer cylinder 100 and/or trunnion arm 102 may require reinforcement. For example, without the portion 204, the outer cylinder 100 and/or the trunnion arm 102 might require reinforcing material to compensate for the stress spreading from the centering portion 202. Thus, the stress relieving portion 204 may help to reduce the weight of the landing gear in several ways.

With additional regard to the stress relieving portion 204, in various embodiments, one or both of the size and specific positions of the portion 204 may be varied to achieve varying reductions in stress spreading from the centering portion 202. In various embodiments, the stress relieving portion 204 may comprise a diameter that is less than the diameter of the centering portion 202. For example, in certain embodiments, 10% reductions in stress have been achieved over more conventional systems.

Figure 3:
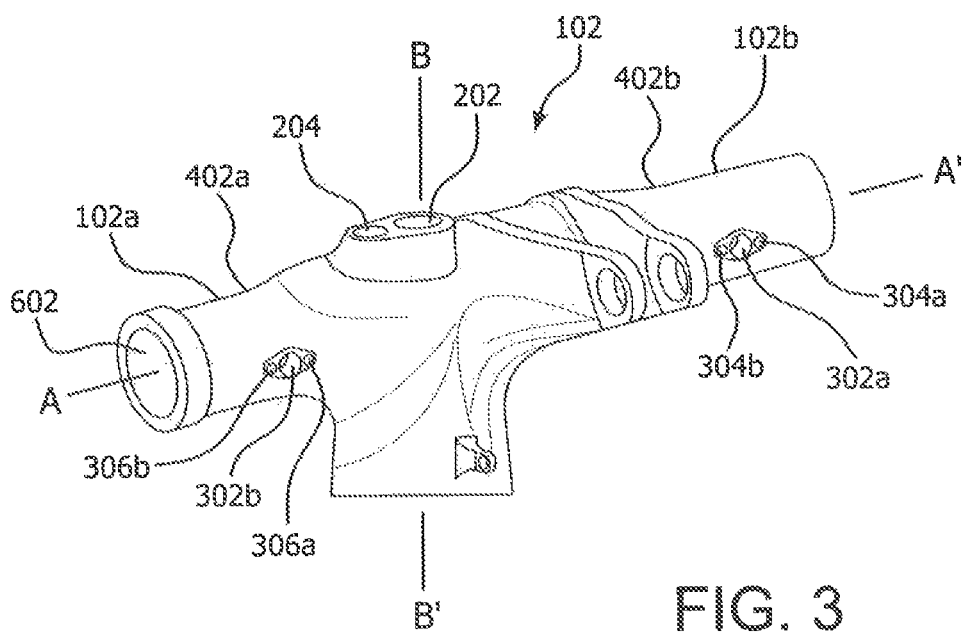
FIG. 3 illustrates, in accordance with various embodiments, a perspective view of a trunnion arm having stress relieving portions.

With regard now to FIG. 3, and as discussed more briefly above, a trunnion arm 102 may include one or more cross bolt portions 302a and/or 302b. These cross bolt portions 302a and/or 302b may exist as a byproduct of the trunnion arm 102 manufacturing process. In addition, as described above, the cross bolt portions 302a and/or 302b may comprise a perimeter that defines a space, a cavity, an aperture, and/or a hole. In various embodiments, the cross bolt portions 302a and/or 302b may comprise an annular shape and/or an annulus. Further, as described above, during loading, each cross bolt portion 302a and/or 302b may act as a source of stress to the trunnion arm 102 and/or the outer cylinder 100. Stress may spread generally along the outer cylinder 100 along the axis marked B-B', while, along the trunnion arm 102, stress may generally spread along the axis marked A-A'. This stress may be reduced by the addition of one or more stress relieving portions, such as stress relieving portions 304a, 304b, 306a, and/or 306b disposed substantially adjacent to the cross bolt portions 302a and/or 302b. Each stress relieving portion 304a, 304h, 306a, and/or 306b may also comprise a perimeter that defines a space, a cavity, an aperture, and/or a hole. In various embodiments, the stress relieving portions 304a, 304b, 306a, and/or 306b may comprise an annular shape and/or an annulus.

In various embodiments, although not shown with respect to FIGS. 1, 2, 4, and 5, the stress relieving portions 304a, 304b, 306a, and/or 306b may be included adjacent to each of the cross bolt portions 302a and/or 302b. The stress relieving portions 304a, 304b, 306a, and/or 306b are omitted from these figures merely for the sake of simplicity. Further, with regard to FIG. 3, although the trunnion arm 102 may in shape appear somewhat different from the shapes of the trunnion arm 102 depicted in the balance of the remaining figures, in fact, the trunnion arm depicted at FIG. 3 may in fact comprise the same trunnion arm 102 depicted in FIGS. 1, 2, 4, and 5.

In addition, as described above with respect to the stress relieving portion 204 situated adjacent the centering portion 202, the inclusion in trunnion arm 102 of one or more stress relieving portions 304a, 304b, 306a, and/or 306b may reduce the weight of the trunnion arm 102 and/or the outer cylinder 100. For example, the absence of trunnion arm 102 material arising as a result of portions 304a, 304b, 306a, and/or 306b may, as can be seen, reduce the weight of the trunnion arm 102 over conventional systems. In addition, however, the reduction in stress effectuated through the use of portions 304a, 304b, 306a, and/or 306b may permit the use of a smaller quantity of (or no) reinforcing material in either or both of trunnion arm 102 and/or outer cylinder 100.

Figure 4:
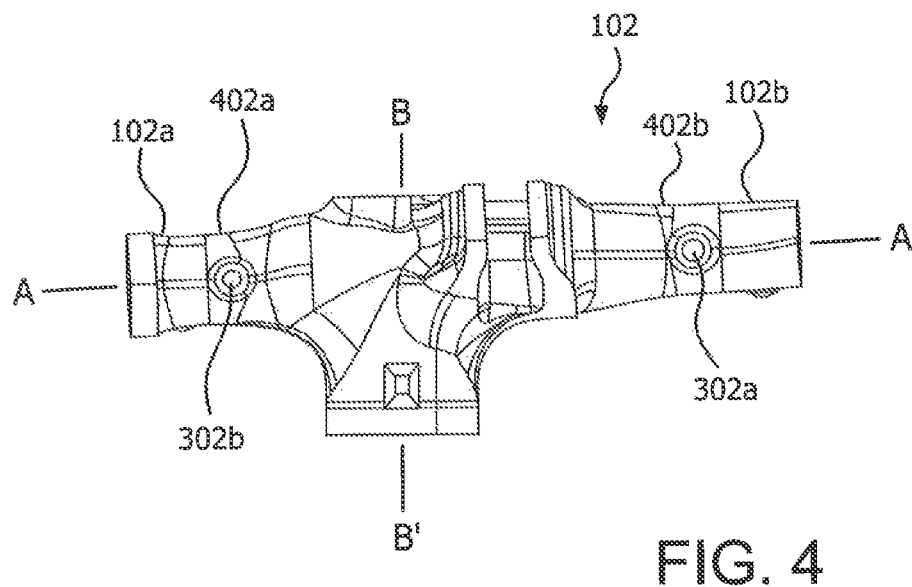
FIG. 4 illustrates, in accordance with various embodiments, a side perspective view of a trunnion arm having a curved outer profile.
Figure 5:
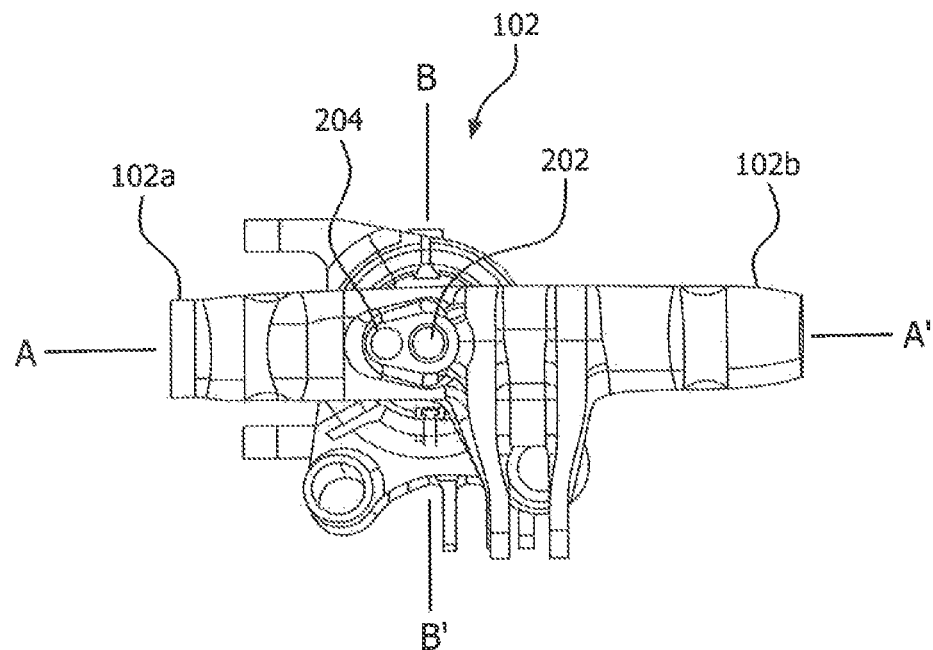
FIG. 5 illustrates, in accordance with various embodiments, a top perspective view of a trunnion arm having a curved outer profile.
Figure 6:
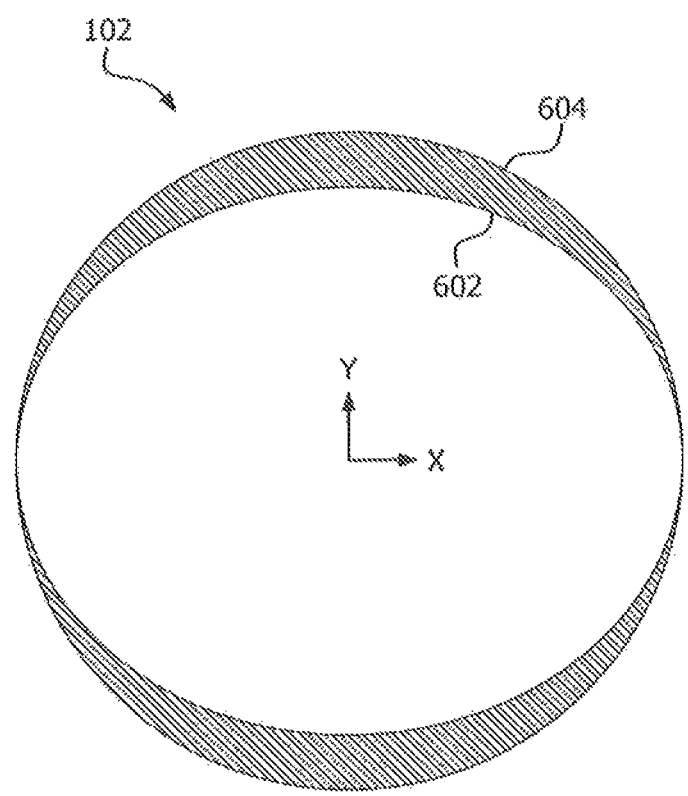
FIG. 6 illustrates, in accordance with various embodiments, a cross-sectional view of a trunnion arm.

With reference now to FIGS. 4, 5, and 6, as shown, an inner profile 602 and/or an outer profile 604 of a first portion 102a and/or second portion 102b of a trunnion arm 102 may comprise a curved and/or circular shape. For example, in various embodiments, an inner profile 602 and/or an outer profile 604 of a first portion 102a and/or second portion 102b of a trunnion arm 102 may comprise an hourglass shape. Similarly, in various embodiments, inner profile 602 and/or an outer profile 604 of the first portion 102a and/or second portion 102b of the trunnion arm 102 may comprise an elliptical shape. Further still, in various embodiments, an inner profile 602 and/or an outer profile 604 may comprise a circular shape. As described above, the first portion 102a may generally extend along the axis A-A' from the axis B-B' in the direction of A. Similarly, the second portion 102b may generally extend along the axis A-A' from the axis B-B' in the direction of A'.

Thus, in various embodiments, an inner profile 602 and/or an outer profile 604 of a portion 102a and/or a portion 102b may comprise a circular, curved, hourglass, and/or elliptical shape. Accordingly, in various embodiments, the diameter of an inner profile 602 and/or an outer profile 604 of a portion 102a and/or 102b may vary along the axis A-A' of the trunnion arm portion 102a and/or 102b such that the respective portion's diameter is greater at its free axial end than it is at a more central location (e.g., central locations 402a and/or 402b) of the trunnion arm 102. A cross-sectional view of a trunnion arm 102 having a circular outer profile 604 and a curved inner profile 602 is shown at FIG. 6. Further, in various embodiments, an inner profile 602 of each trunnion arm portion 102a and/or 102b may comprise a non-curved, linear, or simply a circular or cylindrical shape, and/or the inner profile 602 of each portion 102a and/or 102b may also comprise a curved shape, as described above. Further, in various embodiments, the inner profile 602 and/or outer profiles 604 of a trunnion arm portion 102a and/or 102b may be machined to a variety of shapes.

With respect to the operation of a curved trunnion arm portion 102a and/or 102b, stress (generated by the weight of the aircraft) may be concentrated in or around the cross bolt portions 302a and/or 302b (e.g., in a plane defined by the cross bolt 302a and/or 302b). Thus, the material comprising trunnion arm portions 102a and/or 102b may be biased, as described, to form a curved, hourglass, and/or elliptical shape to produce higher strength in the trunnion arm portions 102a and/or 102b, thereby reducing stress at the cross bolt portions 302a and/or 302b (and/or in the plane of the cross bolt portions).

As described more generally above, the introduction of curved trunnion arm portions 102a and/or 102b may reduce the weight of the trunnion arm 102 over a conventional trunnion arm, as less material may be used in the construction of the trunnion arm. In addition, the lifetime of the trunnion arm 102 and/or outer cylinder 100 may be improved by the reduction in stress over that experienced by conventional systems.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more."

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft landing gear system comprising:
a trunnion arm extending along a first axis and having a centering portion and a first stress relieving portion,
wherein the centering portion comprises a first perimeter that defines at least one of a first aperture or a first hole,
wherein the first stress relieving portion comprises a second perimeter that defines at least one of a second aperture or a second hole, with the second perimeter defined by an annular surface;
wherein the centering portion and the first stress relieving portion are formed in a surface of the trunnion arm; and
an outer cylinder extending along a second axis and coupled to the trunnion arm,
wherein the first stress relieving portion is configured to relieve stress spreading from the centering portion to the outer cylinder.

2. The aircraft landing gear of claim 1, wherein the first stress relieving portion is disposed adjacent the centering portion.

3. The aircraft landing gear of claim 1, wherein the first stress relieving portion relieves stress spreading from the centering portion to the trunnion arm.

4. The aircraft landing gear of claim 1, further comprising a cross bolt portion formed in a portion of the trunnion arm and a second stress relieving portion disposed adjacent the cross bolt portion.

5. The aircraft landing gear of claim 4, wherein the second stress relieving portion relieves stress spreading from the cross bolt portion to the trunnion arm.

6. The aircraft landing gear of claim 1, further comprising a cross bolt portion formed in a portion of the trunnion arm, and a second stress relieving portion and a third stress relieving portion disposed adjacent to the cross bolt portion.

7. The aircraft landing gear of claim 6, wherein the second stress relieving portion and the third stress relieving portion relieve stress spreading from the cross bolt portion to the trunnion arm.

8. The aircraft landing gear of claim 1, wherein the trunnion arm has a curved outer profile.

9. The aircraft landing gear of claim 1, wherein the trunnion arm has circular outer profile.

10. The aircraft landing gear of claim 1, wherein the trunnion arm has an elliptical outer profile.

11. The aircraft landing gear of claim 7, wherein the trunnion arm has a cylindrical inner profile.

12. A trunnion arm for a landing gear comprising:
a centering portion including a first perimeter that defines at least one of a first aperture or a first hole; and
a first stress relieving portion disposed adjacent to the centering portion and comprising at least one of a second aperture or a second hole defined by a second perimeter having an annular shape,
wherein the first stress relieving portion relieves stress spreading from the centering portion to other portions of the landing gear including an outer cylinder.

13. The trunnion arm of claim 12, wherein the first stress relieving portion is disposed adjacent the centering portion.

14. The trunnion arm of claim 12, wherein the first stress relieving portion relieves stress spreading from the centering portion to at least one trunnion arm portion.

15. The trunnion arm of claim 12, further comprising a cross bolt portion formed in a portion of the trunnion arm and a second stress relieving portion disposed adjacent the cross bolt portion.

16. The trunnion arm of claim 15, wherein the second stress relieving portion relieves stress spreading from the cross bolt portion to at least one trunnion arm portion.

17. The trunnion arm of claim 12, further comprising a cross bolt portion formed in at least one trunnion arm portion and a second stress relieving portion and a third stress relieving portion disposed adjacent the cross bolt portion.

18. The trunnion arm of claim 17, wherein the second stress relieving portion and the third stress relieving portion relieve stress spreading from the cross bolt portion to the at least one trunnion arm portion.

19. The trunnion arm of claim 12, wherein the trunnion arm has a curved outer profile.

* * * * *